March 14, 1933. H. A. HUSTED 1,901,599
STEERING WHEEL
Filed Feb. 11, 1927  4 Sheets-Sheet 1

Inventor.
Harry A. Husted
Evans & McCoy
Attorneys

March 14, 1933. H. A. HUSTED 1,901,599
STEERING WHEEL
Filed Feb. 11, 1927 4 Sheets-Sheet 2
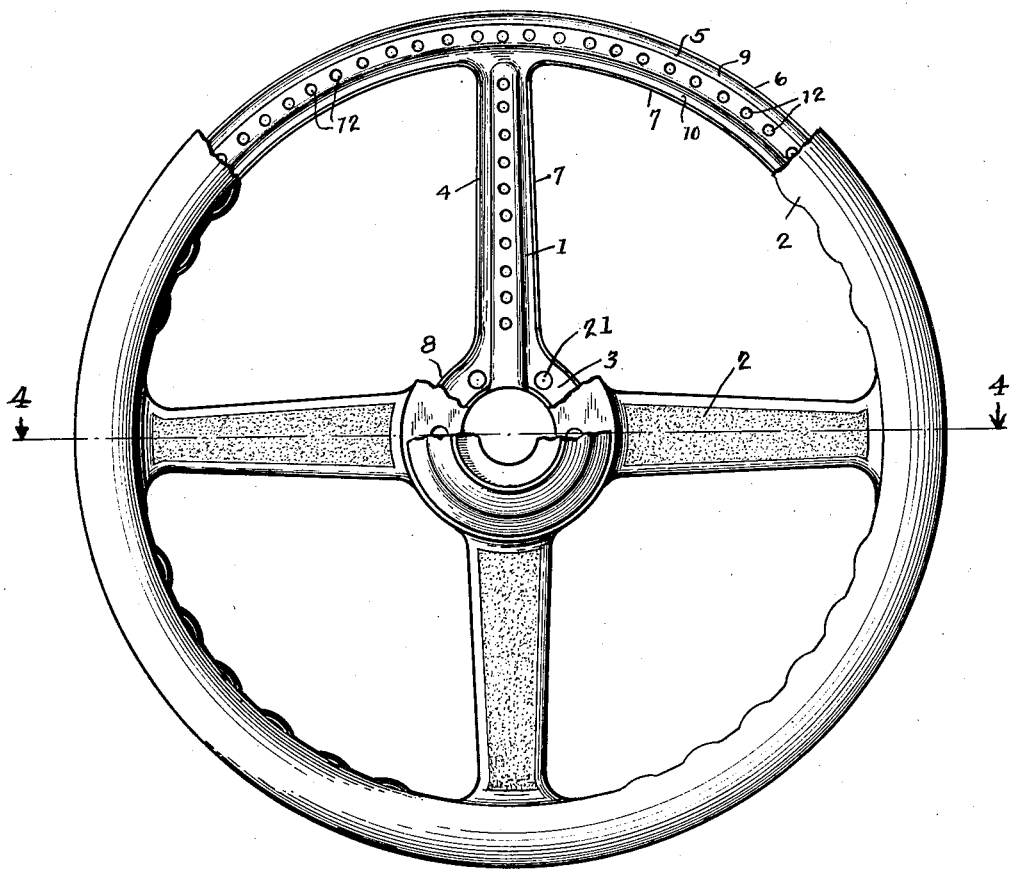
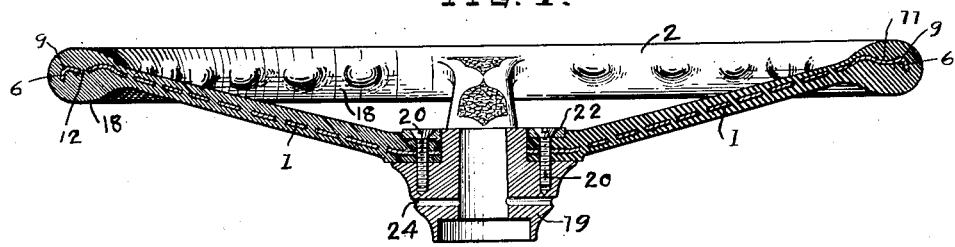
Inventor.
Harry A. Husted
Evans & McCoy
Attorneys.

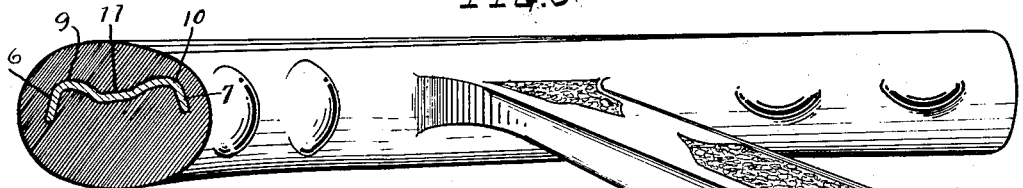
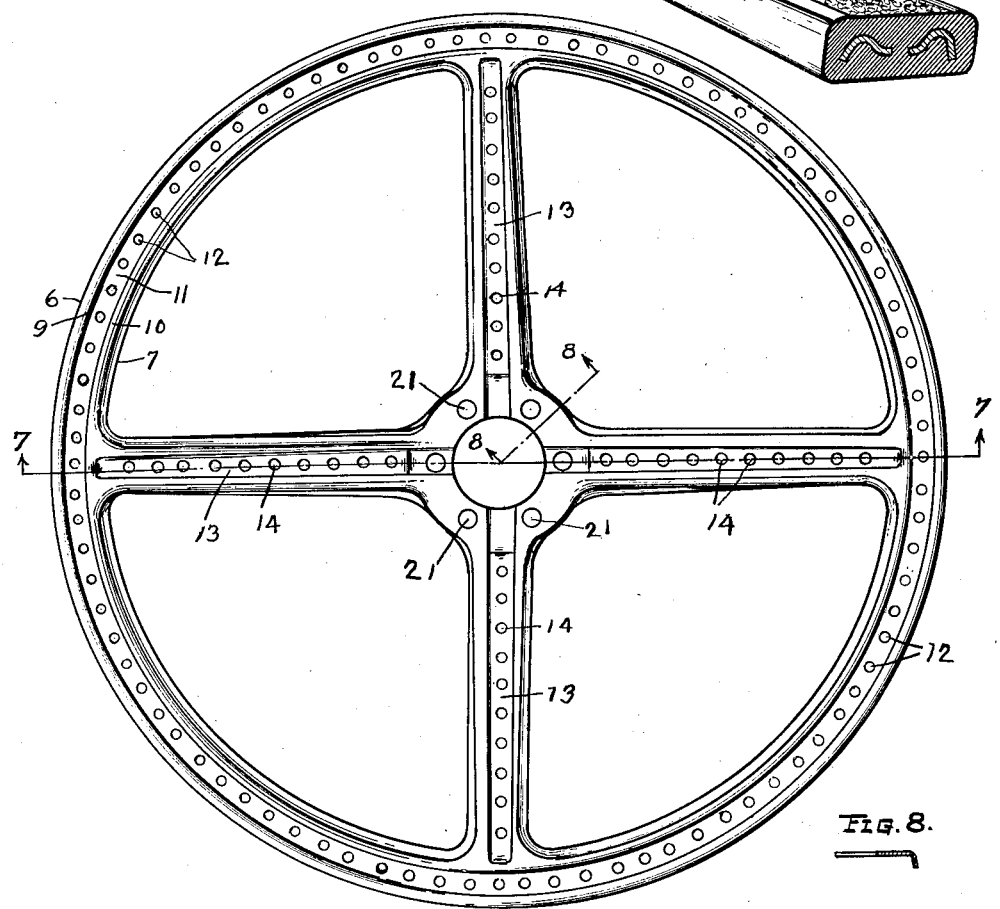
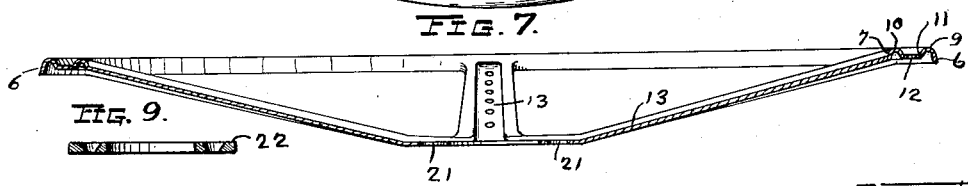
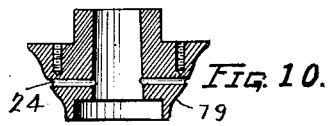

March 14, 1933. H. A. HUSTED 1,901,599
STEERING WHEEL
Filed Feb. 11, 1927 4 Sheets-Sheet 4

Inventor.
Harry A. Husted
Evans & McCoy
Attorneys.

Patented Mar. 14, 1933

1,901,599

UNITED STATES PATENT OFFICE

HARRY A. HUSTED, OF CLEVELAND, OHIO, ASSIGNOR TO THE H. A. HUSTED COMPANY, OF DETROIT, MICHIGAN, A CORPORATION OF MICHIGAN

STEERING WHEEL

Application filed February 11, 1927. Serial No. 167,387.

This invention relates to steering wheels for automotive vehicles and it particularly contemplates an improved form of reinforced composition steering wheel having a reinforcing element consisting of a pressed metal spider that is embedded in a body of plastic moldable material.

Steering wheels have heretofore been proposed which embodied pressed metal parts embedded in moldable plastic material, but such wheels generally embodied a series of spokes having a rim of molded rubber or other composition carried by the ends of said spokes. Wheels of this general character have many inherent defects. For instance, in lifting from the molding cavity a wheel of the previously proposed type wherein the spoke ends carry a rim of molded composition, the molded material between the spoke ends some times loosened from the spoke ends particularly if a hard rubber moldable composition is used. The same difficulty arises in the use of a formed wood rim with metal spokes. This gives rise many times to the separation or partial separation of the molded embedding material from the spokes in service or to a high percentage of defective and usually rejected manufactured product. An additional inherent defect of the previously proposed steering wheels embodying spokes which terminate in opposed arms, or other discontinuous parts embedded in the rim of the wheel, arises from the tendency of the rim parts of the wheel to break away from the spoke ends in disastrous wrecks and the like, thereby causing the spokes of the wheel to do great damage to the driver.

An additional defect of the previously proposed wheels is the nonuniform strength of the rim and spoke portions of the wheel particularly at the intersection of the spokes with the rim and the spokes with the hub portion.

Applicant herein proposes a steering wheel that substantially overcomes the difficulties inherent in wheels of the character heretofore proposed. The proposed steering wheel embodies a completely embedded pressed metal reinforcing spider having a continuous rim and integral spoke elements that are preferably formed from a single metal plate. The reinforcing spider is formed with continuous stiffening flanges on each edge portion of the spokes and rim. The wheel furthermore has the spokes and rim so channeled, beaded, and flanged as to provide substantially uniform strength in every element of the wheel so that in the event of a disastrous wreck, the driver will not be seriously injured from the steering wheel as has heretofore been the condition. A wheel of the character proposed herein will usually distort or collapse in the spoke elements without rupture, thus avoiding the dangers of the rim breaking away from the spokes which have heretofore often penetrated the body of the driver in serious accidents.

Applicant furthermore proposes a steering wheel herein that has a soft cushion-like rim grip portion that tends to relieve the driver from road vibrations usually transmitted through steering wheels of conventional design. This also provides a tractive grip that is particularly beneficial for use with large heavy weight passenger busses, trucks and the like.

One of the objects of the invention is to provide a steering wheel of the above character in which the reinforcing spider is formed with a continuous rim and spokes integrally connected with the rim and with a hub portion, the entire spider being embedded in a suitable moldable material.

An additional object of the invention is to provide a reinforced composition steering wheel of uniform strength around its rim and so arranged that portions of the rim of the wheel will not separate from the spoke elements during service or in the event of a wreck.

Another object of the invention is to provide a single piece integral metal reinforcing spider for a composition steering wheel that serves to distribute vulcanizing or curing heat uniformly through all partss of the molded body of the wheel composition during the vulcanization or curing process, thereby avoiding over vulcanization of some parts of the wheel structure while other parts are insufficiently cured. A single piece spider of this general character furthermore gives support to every part of the molded composition when the wheel is removed from the mold.

These and other objects and advantages of utilizing the invention will be apparent to those skilled in the art from a consideration of the description and accompanying drawings wherein:

Fig. 3 is a plan view of the under side of a steering wheel embodying the invention in which a portion of the embedding material of the rim and of one of the spokes and adjacent hub portion is broken away to more clearly illustrate the form of spider construction proposed by applicant.

Fig. 4 is a sectional view taken substantially on line 4—4 of Fig. 3, looking in the direction of the arrows.

Fig. 5 is an enlarged transverse sectional view in perspective, taken through the rim and through one of the spoke elements of the steering wheel shown in Fig. 1 with other parts broken away.

Fig. 6 is a plan view of the upper side of a steering wheel spider constructed in accordance with the invention.

Fig. 7 is a sectional view taken substantially on line 7—7 of Fig. 6.

Fig. 8 is a transverse sectional view of the hub portion of the spider taken substantially on line 8—8 of Fig. 6.

Fig. 9 is a side sectional view of the clamping washer for securing the hub member to the wheel assembly.

Fig. 10 is a sectional view of a universal hub sleeve member used in association with the wheel.

Figure 1:
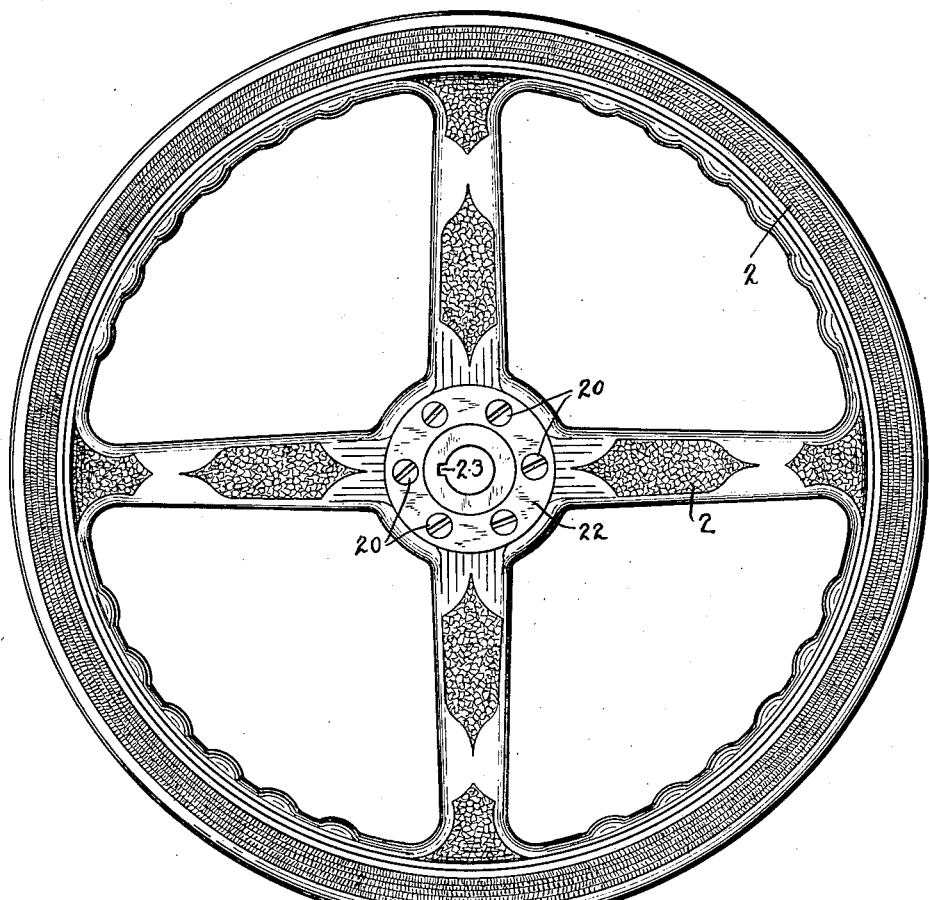
Figure 1 is a plan view of a completed steering wheel constructed in accordance with the invention.
Figure 2:
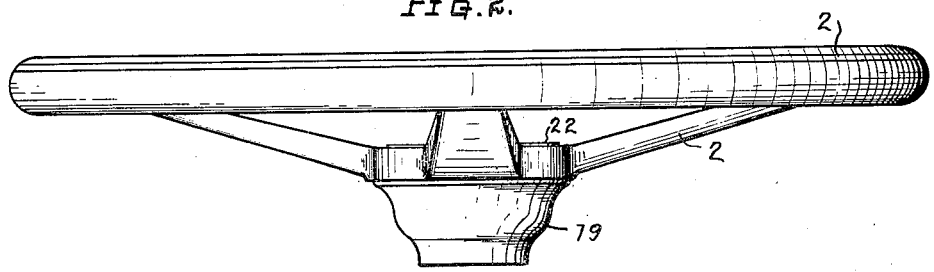
Figure 2 is a side view of the steering wheel shown in Figure 1.

The wheel shown in the accompanying drawings and particularly in Figs. 1 to 10, inclusive, comprises a spider 1 that is completely embedded in a suitable molded composition 2. The spider comprises a hub portion 3 and arms 4 that are integrally connected therewith and that terminate at their outer ends in an endless rim portion 5 that is integral with the spoke elements. The spider is preferably formed of a single sheet of pressed steel plate that is suitably flanged, beaded and channeled along the spokes and rim to provide a spider structure of uniform strength throughout particularly including the zones of connection of the spokes with the rim and with the hub.

The form of spider chosen to illustrate the invention has a continuous edge flange 6 that extends completely around the rim of the wheel. A corresponding edge flange 7 extends along the edge portions of the spokes and rim portions. This flange 7 may also extend across the hub between the inner ends of the spokes as shown by the flange portion 8 of the spider.

The spider also has an endless bead 9 or ribbed portion extending completely around the outer edge of the rim at the base of the flange 6. A corresponding bead 10 extends around the inner edge portion of the rim, the spokes, and preferably across each spoke end. This assists in giving to the rim great strength. The center portion of the rim has an endless channel 11 wherein a series of spaced holes 12 are formed in the channeled portion of the rim to assist in positively bonding the moldable composition of the wheel to the spider and to assist in dampening vibrations transmitted through the steering post. This also compensates for distortions in the embedding composition caused by atmospheric changes.

The body of each spoke is provided with a longitudinal channel 13 that has a series of holes 14 that correspond to the holes 12 of the rim for rigidly securing the embedding composition of the wheel body to the spider. The channeled portion of each spoke element preferably extends from the beaded portion of the rim substantially to the opening through the hub portion of the spider.

It will be noted that this method of reinforcing the spider gives to the rim element substantially uniform cross sectional strength with particular reinforcement at the connection of the rim with the spoke ends and at the connection of the hub. These connections are relatively unbreakable compared to the other portions of the spider, so that the spider will not rupture, particularly at the points of connection between the rim and spokes. The channeled portions of the spokes each give to the spokes sufficient longitudinal strength to effectively handle all stresses that are normally imposed on the steering wheel. The strength of the spoke is, however, insufficient to cause the spoke to break away from the rim in the event of an accident. If a wheel of this character is subjected to the terrific strain introduced in severe accidents, the spokes of the wheel will yield before the rim tears away from the spoke elements thereby enabling the wheel to collapse against the body of the driver because of the distortion of the spokes. The rim, being carried by the outer ends of the spokes, prevents fatal damage to the driver from the penetration of spokes which has heretofore so often resulted in accidents involving steering wheels of conventional character.

It will be noted from a study of this spider construction, that the under side of the wheel spider provides an endless channel in the beading adjacent the flanged portion that serves to carry entrapped gases from adjacent the spider body to the hub portion where they may escape. The holes that are formed in the rim portion and the spoke portions of the spider permit the entrapped gases to flow from the upper side of the spider to the under side of the wheel where they are carried to the hub of the spider in the manner described.

The channeled, beaded and flanged arrangement of the rim and spoke portions of the spider provides reinforcement for these portions that prevents lateral distortion of the metal spider from violent changes in temperature, such as those incurred in moving a car from an exposed position on a cold day to a heated garage and the like. Without the lateral reinforcement of the rim and spoke portions of the spider, the tendency of the rim portion of the spider to buckle tends also to break away the spider from the embedding molded composition and to crack the composition due to localized differences in temperature.

The molded body of the steering wheel may be formed of any desirable character of moldable composition such as hard rubber composition, condensation products, or other suitable materials.

A particularly improved form of steering wheel may be constructed by embedding at least the rim portion of the spider in a soft yielding rubber composition. The spoke portions and hub of the wheel can either be covered with a correspondingly soft rubber composition or with any other desired character of moldable compound that will satisfactorily unite with the rubber compound used in the rim of the wheel. A particularly desirable character of covering of this nature is illustrated in Fig. 5 wherein the covering of the spokes and hub portions of the wheel is of relatively hard rubber whereas the rim of the wheel is embedded in a relatively soft yielding character of rubber composition that provides an effective grip and that particularly relieves fatigue to the driver propelling vehicles of heavy weight such as trucks, busses, and the like.

Figure 11:
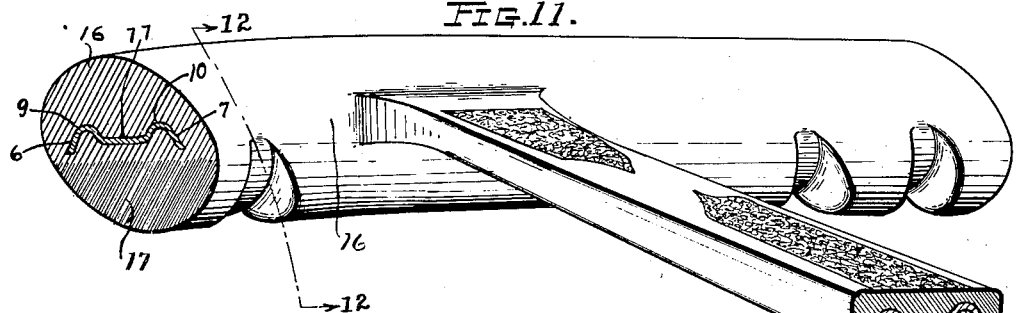
Fig. 11 is an enlarged transverse sectional view through a portion of the rim and one of the spokes with other parts broken away to particularly illustrate a modified form of rim.
Figure 12:
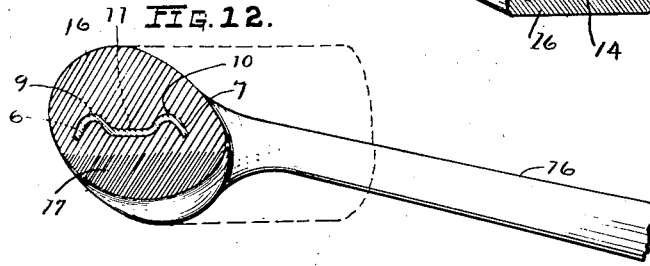
Fig. 12 is a transverse sectional view taken substantially on line 12—12 of Fig. 11 showing an improved form of proposed finger grip and rim construction.
Figure 13:
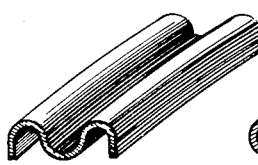
Figs. 13 to 19, inclusive, are cross sectional perspective views of different proposed forms of reinforcing metal spider structures for use in forming the wheel.

Applicant also proposes forming the palm engaging portion 16 of the rim covering of the wheel, shown in Fig. 11 and Fig. 12, of a relatively hard rubber composition and providing a finger gripping portion 17 of the rim of relatively soft compressible rubber composition of such character that it can be comfortably compressed by the grip of the driver. This structure is of particular advantage for use on trucks and other equipment where objectionable road vibration is transmitted to the steering wheel. The form of wheel shown in Fig. 11 and Fig. 12 is particularly adaptable for the use of soft yielding rubber composition as a partial or complete embedding material for the rim.

If a steering wheel rim made principally of hard rubber composition is used, the finger gripping portion of the under side of the wheel may be surfaced with a strip of crepe rubber 18 that is vulcanized thereto when the wheel is molded. These improved features of the wheel greatly increase the comfort of driving and the ease of handling the vehicle particularly at critical times.

Because of the variety of steering posts that are in use in the automotive industry, the universal type of hub proposed by applicant is of particular importance in its adaptability to the various types and makes of automotive vehicles. Applicant's proposed universal hub member comprises a hub sleeve 19 that is suitably threaded to receive a series of securing screws 20 that extend through apertures 21 formed in the hub portion of the spider. The head portions of the screws 20 are seated in suitable apertures formed in a partially embedded washer 22. The hub sleeve is provided when desired with a keyway 23 and a suitable transverse aperture 24 for receiving a transverse pin that passes through the steering column. The size and shape of the steering post-receiving portion of the sleeve 19 are the only elements of the steering wheel that require changes for the mounting of the wheel on various different types and kinds of automotive equipment. By utilizing a universal hub of this character, a standard form of pressed metal spider and molded body portion can be fitted to a very great variety of kinds of automotive equipment which is of particular benefit in the art.

Figure 14:
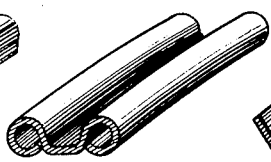
Figure 15:
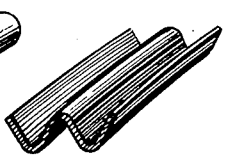
Figure 16:
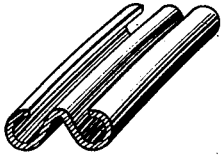
Figure 17:
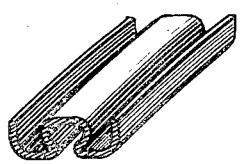
Figure 18:
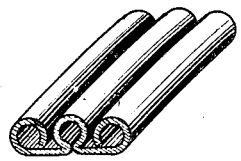
Figure 19:
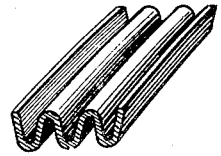

It is to be understood that applicant's invention is not limited to the particular form of channeled, beaded and flanged structure that is shown in Figs. 1 to 10 of his application. It is essential, however, that the spider be a single integral member and that it be reinforced by flanges around the rim that cooperate with suitable flanges along the spokes to give the desired characteristics to the wheel. The same structural characteristics and advantages that are incident to the preferred structure may also be obtained by forming the structural contour of the pressed metal rim and spoke elements of the wheel in the different transverse configurations shown in Figs. 13 to 19, inclusive. It will be noted that, in each of these characteristic forms, an endless flange is provided that extends around the rim and the edge portions of the openings in the spider. The channeled portions and preferably beaded portions are also formed in the spider elements in order to obtain the characteristic reinforcing features above described. In certain of the designs proposed, such for instance as that shown in Fig. 14 and Fig. 18, considerable lightness is obtained in the wheel by providing cavities in the spider that do not receive the molded composition and that are defined by curved portions of the metal of the spider and rim. The formation of apertures of this character in the interior of the wheel provide a lightness in weight and economy of material that is very important in this character of structure.

The advantages to be obtained from the practice of this invention will be apparent to those skilled in the art. The safety features of the wheel structure proposed are of material importance since they protect the driver of automotive vehicles and also insure safety to the passengers through complete control of the equipment at all times. An additional feature of the wheel that is of considerable importance at the present time is the ability of the structure to withstand sudden atmospheric changes in temperature as well as mosture, salt air and acid fumes without corrosion or separation of the spider from the embedding material. The improved gripping qualities of the soft rubber rim portions and the ability of the wheel to relieve the driver of vibration transmitted from the road is also of considerable importance.

Although applicant has herein described a few preferred embodiments of his invention, it is understood that he is not limited to the specific forms illustrated and that the invention is to be construed as broadly as the prior art will permit.

What I claim is:

1. A steering wheel for automotive vehicles comprising a metal spider and a rim of molded composition characterized by a palm engaging portion of relatively hard rubber and a finger grip portion of the rim formed of relatively soft yielding rubber composition.

2. A steering wheel for automotive vehicles comprising a metal spider and a rim of molded composition characterized by a palm engaging portion of relatively hard rubber and a finger grip portion formed of crepe rubber molded into the rim of the wheel.

3. A reinforced composition steering wheel for motor vehicles comprising a reinforcing element in the form of a one-piece sheet metal spider of laterally dished form embodying a rim, hub and spokes, said rim and spokes being of channel form in cross section with their channels facing to the same side of the wheel, the flanges of the spokes being continuous with the inner flanges of the rim, and a body composed of an initially plastic composition molded around and substantially completely embedding the spokes and rim.

4. A reinforced composition steering wheel for motor vehicles comprising a one-piece metal reinforcing spider of laterally dished form embodying a rim, hub and spokes, said spider having a continuous flange extending around the outer side of the rim and a continuous flange extending around each opening between successive spokes; each of the latter flanges having arcuate portions along the inner side of the rim and along the outer side of the hub and portions connecting the arcuate portions and forming side flanges on said spokes, all of said flanges extending laterally in the direction toward which the wheel is dished, and a body composed of an initially plastic composition molded around and substantially completely embedding the spokes and rim of the spider.

5. A reinforced composition steering wheel for motor vehicles comprising a one-piece sheet metal reinforcing spider of laterally dished form embodying a rim, hub and spokes, said rim and spokes being of channel form in cross section with their channels facing to the same side of the wheel, the flanges of the spokes being continuous with the inner flanges of the rim, said rim having a continuous annular corrugation pressed in the web thereof between its side flanges, each spoke having a longitudinal corrugation in its web, extending from the hub to the rim, said corrugations forming stiffening ribs and having spaced openings therein, and a body composed of an initially plastic composition molded around and substantially completely embedding the rim and spokes of the spider and extending through said openings.

6. A reinforced composition steering wheel for motor vehicles comprising a metal reinforcing spider of laterally dished form embodying a rim, hub and spokes, said rim and spokes being of channel form in cross section and having webs formed with corrugations between the flanges forming ribs projecting in the same direction as the flanges, and a body composed of an initially plastic composition molded around and embedding the spokes and rim of the spider.

7. A reinforced composition steering wheel for motor vehicles comprising a metal reinforcing spider of laterally dished form embodying a rim, hub and spokes integrally connected, said rim and spokes being of channel form in cross section with side flanges extending laterally of the spider, the webs and flanges of the spokes merging into the hub and into the web and inner flanges of the rim, the webs of said spokes having longitudinal corrugations between the side flanges thereof projecting in the same direction as the flanges, said corrugations extending into the hub, and a body composed of an initially plastic composition molded around and embedding the rim and spokes of the spider.

8. A reinforced composition steering wheel for motor vehicles comprising a single piece sheet metal reinforcing spider embodying a rim, spokes and hub annulus, said rim having a coextensive stiffening flange at its outer edge and inner stiffening flanges at its inner edge between said spokes, and said spokes having coextensive stiffening flanges extending from said hub annulus to and integrally joining said inner stiffening flanges of said rim at the connection between the rim and spokes, said inner flanges of said rim and flanges of said spokes extending in the same direction, whereby rigid and relatively unbreakable connections between the rim and spokes are provided, a metal hub secured to said hub annulus, and a body of relatively stiff composition molded around and embedding said rim and spokes and their stiffening flanges and intimately contacting with the surfaces of said rim and spokes at substantially all points, whereby the rim and spokes are completely covered by said composition to form a steering wheel the surface of which may be finished in any desired manner.

9. A reinforced composition steering wheel for motor vehicles comprising a reinforcing spider embodying a rim of sheet metal deformed in transverse section to form coextensive stiffening means extending therearound, a metal hub, and spokes of sheet metal deformed in transverse section to provide coextensive stiffening means, the stiffening means of the spokes and the stiffening means of the rim co-operating to produce a spider of substantially the same strength throughout its entire extent, whereby a relatively unbreakable connection between the spokes and rim is provided, and a body of composition molded around and embedding said rim and spokes and filling said deformations and intimately contacting with the rim and spokes at substantially all points.

10. A reinforced composition steering wheel comprising a relatively rigid dished reinforcing spider embodying a rim of sheet metal deformed in transverse section to stiffen it at substantially all points thereof, a metal hub, and spokes of sheet metal deformed in transverse section to stiffen them from the hub to the rim, and a body of composition molded around and filling the deformations in and completely embedding said rim and spokes, whereby said body is held in intimate contact with said rim and spokes at substantially all points and a relatively strong structure is provided.

11. In a steering wheel, a hub having a corrugated reinforcing member embedded therein, a rim spaced outwardly from said hub also having a corrugated reinforcing member embedded therein, and spokes connecting said hub and rim having corrugated reinforcing members embedded therein and terminally secured to the reinforcing members aforesaid, said rim and hub reinforcing members including marginal flanges extending between said reinforcing members of said spoke members, and said spoke reinforcing members having side flanges extending between and being joined with the marginal flanges of said rim and the hub reinforcing members.

12. In a steering wheel, a rim having a corrugated reinforcing member embedded therein provided at spaced points with laterally projecting flanges, and spokes connecting into said rim also having reinforcing members embedded therein rigidly secured to the lateral flanges aforesaid.

13. In a steering wheel, a wheel body including a hub, spokes and rim, and reinforcing means for said body including a member embedded in said rim, and channel-shaped members embedded in the spokes and having certain portions of said channel members extending and secured respectively to the member in said rim and to said hub.

In testimony whereof I affix my signature.

HARRY A. HUSTED.